United States Patent
Papandreou et al.

(10) Patent No.: US 11,238,295 B2
(45) Date of Patent: Feb. 1, 2022

(54) DISTRIBUTED PROCESSING OF A DIGITAL IMAGE

(71) Applicant: International Business Machines Corporation, Armonk, NY (US)

(72) Inventors: Nikolaos Papandreou, Thalwil (CH); Andreea Anghel, Adliswil (CH); Milos Stanisavljevic, Adliswil (CH); Charalampos Pozidis, Thalwil (CH)

(73) Assignee: International Business Machines Corporation, Armonk, NY (US)

( * ) Notice: Subject to any disclaimer, the term of this patent is extended or adjusted under 35 U.S.C. 154(b) by 401 days.

(21) Appl. No.: 16/357,672

(22) Filed: Mar. 19, 2019

(65) Prior Publication Data
US 2020/0302203 A1  Sep. 24, 2020

(51) Int. Cl.
| | |
|---|---|
| G06K 9/00 | (2006.01) |
| G06T 7/11 | (2017.01) |
| H04L 29/08 | (2006.01) |
| G06T 3/40 | (2006.01) |
| G06T 7/194 | (2017.01) |

(52) U.S. Cl.
CPC ............ G06K 9/00979 (2013.01); G06T 3/40 (2013.01); G06T 7/11 (2017.01); G06T 7/194 (2017.01); H04L 67/10 (2013.01)

(58) Field of Classification Search
CPC .................................. G06T 3/40; H04L 64/10
See application file for complete search history.

(56) References Cited

U.S. PATENT DOCUMENTS

| | | | |
|---|---|---|---|
| 8,165,426 B2 | 4/2012 | Konig | |
| 9,704,207 B2 | 7/2017 | Wall | |
| 2007/0273765 A1* | 11/2007 | Wang | G06K 9/38 348/152 |
| 2008/0154928 A1* | 6/2008 | Bashyam | H03M 7/30 |
| 2008/0184254 A1 | 7/2008 | Bernard et al. | |

(Continued)

OTHER PUBLICATIONS

Kumar, V., et al., "Large-scale Biomedical Image Analysis in Grid Environments", IEEE Transactions on Information Technology in Biomedicine, Mar. 2008, vol. 12, Issue 2, https://www.ncbi.nlm.nih.gov/pmc/articles/PMC3294419/, Accessed on Sep. 11, 2018, 29 pages.

(Continued)

Primary Examiner — Edward Park
(74) Attorney, Agent, or Firm — Scully, Scott, Murphy & Presser, P.C.; Daniel P. Morris (57) ABSTRACT

Processing a digital image in a distributed computing environment comprising a communications network interconnecting two or more computing nodes. A segmentation of the digital image into two or more image segments is determined. For each of the image segments, a number of non-background pixels comprised by the image segment is determined. An assignment of each of the image segments to one of the computing nodes is determined. The determination of the assignment may include balancing, based on the number of non-background pixels determined for each of the image segments, the workload of the assigned computing nodes responsive to processing the image segments. Each of the assigned computing nodes may be caused to process the image segments assigned to the computing node.

19 Claims, 3 Drawing Sheets

(56) References Cited

U.S. PATENT DOCUMENTS

| | | | |
|---|---|---|---|
| 2010/0208733 A1* | 8/2010 | Zhao | H04L 12/185 370/390 |
| 2015/0036920 A1* | 2/2015 | Wu | G06K 9/6272 382/156 |
| 2015/0317536 A1* | 11/2015 | Kuehnle | G06T 7/73 382/104 |
| 2017/0330318 A1 | 11/2017 | Shanghvi et al. | |
| 2018/0114324 A1* | 4/2018 | Kim | G06T 5/50 |
| 2018/0213030 A1* | 7/2018 | Choi | G06K 9/6298 |
| 2019/0147086 A1* | 5/2019 | Pal | G06F 16/24545 707/718 |
| 2020/0302203 A1* | 9/2020 | Papandreou | G06F 9/5066 |

OTHER PUBLICATIONS

Macenko, M., et al., "A Method for Normalizing Histology Slides for Quantitative Analysis," 2009 IEEE International Symposium on Biomedical Imaging, Jun. 28-Jul. 1, 2009, pp. 1107-1110.

* cited by examiner

| | Processing mode | Data fits memory | Multi-node availability | Cost function |
|---|---|---|---|---|
| 401 | Single-node Single-batch | Yes | Yes/No | F1 |
| 402 | Single-node Multi-batch | No | Yes/No | F2 |
| 403 | Multi-node Single-batch | Yes/No | Yes | F3 |
| 404 | Multi-node Multi-batch | No | Yes | F4 |

DISTRIBUTED PROCESSING OF A DIGITAL IMAGE

BACKGROUND

The present disclosure relates to distributed data processing of digital images, including, but not limited to, medical images, known as whole-slide images, that are generated by a medical imaging scanner and stored in a multi-resolution or multi-magnification format.

Modern feature recognition technologies, as they are regularly required in digital pathological image analysis, for instance, include machine learning (ML) algorithms which provide trained ML models to enhance the yield of true-positive findings and the processing speed. Pre-processing can reduce the variability of digital image data. This variability may originate from various sources such as staining, lighting conditions, image acquisition technologies, material properties of image acquisition hardware, and subjective sources of variability such as sample positioning. Other pre-processing stages may include sampling, feature extraction, etc. based on the requirements of a given target task. In an example from digital pathology, a pre-processing stage includes stain normalization, while the image analysis includes tumor detection and confidence level grading based on a convolutional neural network (CNN).

Moreover, modern image acquisition technologies such as confocal scanning microscopy allow for recording digital images of extremely large dimensions. For instance, a digital microscope image at "40×" magnification level may have a resolution of 160,000×80,000 pixels, which occupies about 37.5 gigabytes (GB) of memory space in uncompressed format. The state of the art offers both iterative and distributed approaches to pre-processing and ML model training to enable an efficient handling of such large amounts of digital image data.

SUMMARY

In one aspect, the disclosure relates to a computer-implemented method for processing a digital image in a distributed computing environment, the distributed computing environment comprising a communications network interconnecting two or more computing nodes, the method comprising:
  receiving the digital image;
determining a segmentation of the digital image into two or more image segments;
  for each of the image segments, determine a number of non-background pixels comprised by the image segment;
  determining an assignment of each of the image segments to one of the computing nodes, the determination of the assignment comprising balancing, based on the number of non-background pixels determined for each of the image segments, the workload of the assigned computing nodes responsive to processing the image segments; and
  causing each of the assigned computing nodes to process the image segments assigned to the computing node.

In a further aspect, the disclosure relates to a computer program product, in particular a computer-readable medium, the computer program product carrying computer executable code for execution by a processor controlling an apparatus, wherein execution of the instructions causes the processor to perform a method for processing a digital image in a distributed computing environment, the distributed computing environment comprising a communications network interconnecting two or more computing nodes, the method comprising:
  receiving the digital image;
  determining a segmentation of the digital image into two or more image segments;
  for each of the image segments, determine a number of non-background pixels comprised by the image segment;
  determining an assignment of each of the image segments to one of the computing nodes, the determination of the assignment comprising balancing, based on the number of non-background pixels determined for each of the image segments, the workload of the assigned computing nodes responsive to processing the image segments; and
  causing each of the assigned computing nodes to process the image segments assigned to the computing node.

In another aspect, the disclosure relates to a computer system, comprising a processor, a memory and a communication interface to a distributed computing environment, the distributed computing environment comprising a communications network interconnecting the communication interface and two or more computing nodes, the memory carrying computer executable code for execution by the processor, wherein execution of the instructions causes the processor to perform a method for processing a digital image in the distributed computing environment, the method comprising:
  receiving the digital image;
  determining a segmentation of the digital image into two or more image segments;
  for each of the image segments, determine a number of non-background pixels comprised by the image segment;
  determining an assignment of each of the image segments to one of the computing nodes, the determination of the assignment comprising balancing, based on the number of non-background pixels determined for each of the image segments, the workload of the assigned computing nodes responsive to processing the image segments; and
  causing each of the assigned computing nodes to process the image segments assigned to the computing node.

Embodiments of the invention are given in the dependent claims. Embodiments of the present invention can be freely combined with each other if they are not mutually exclusive.

BRIEF DESCRIPTION OF THE DRAWINGS

In the following, embodiments of the invention are explained in greater detail, by way of example only, making reference to the drawings in which.

DETAILED DESCRIPTION

Large digital images may be processed in a distributed manner by partitioning or segmenting the image data into portions which fit into the respective memory of available distributed computing nodes. Known approaches to assigning those image segments to the computing nodes, such as best-effort assignment, may cause differences in the workload of such computing nodes. Hence, an approach to a more balanced workload distribution in distributed digital image processing is desirable.

The present disclosure relates to a processing of a digital image which is partitioned into image segments prior to processing. An image segment is understood herein as a polygonal portion of two-dimensional picture data encoded by the digital image. Preferably, but not necessarily, the digital image encodes a visible picture on a rectangular lattice of data points (pixels) and undergoes (according to the method) a segmentation into rectangular image segments. In some embodiments, all pixels of the digital image are included in the segmentation, i.e., each pixel of the digital image is assigned to one segment. It is contemplated, however, that segmentations may be chosen where adjacent segments may overlap. In this case, some pixels may be assigned to two or more segments. In some embodiments, each pixel is assigned to a given image segment such that at least one neighboring pixel is assigned to the same image segment.

A digital image is understood to be characterized by two linearly independent dimensions (expressed each in numbers of pixels) and the product of these dimensions (i.e. the total number of pixels comprised by the image) is referred to as the resolution of the digital image. According to this definition, a resolution relates to a magnification scale, as commonly used for medical images, by the number of dimensions considered: If, for instance, the resolution of the digital image is labeled as a "40×" magnification, a "20×" copy of the digital image will have one fourth of the "40×" resolution. That is, being a product metric, the resolution counts the differing factor 2 for each image dimension, whereas the magnification refers to a single image dimension and assumes that both image dimensions are scaled with an identical scale factor for each magnification level.

The processing of the digital image, i.e., the execution of an image processing algorithm on the digital image, results in workload for each processing core involved in said execution. The workload of a given processor core is understood herein as the number of processing cycles to complete the processing of a said algorithm on a given image segment of the digital image. The workload is considered here to have a positive correlation to the processing time taken by the core to complete the processing of the workload (as measured from the first cycle).

The phrase "being based on" is meant herein as a non-exclusive statement, i.e. a statement such as "X being based on Y" means that X is not necessarily based on Y alone, but may be also based on one or more further items in addition to Y. Such statements rather emphasize the presence of Y among a full list of dependencies of X, which will be commonly known to a person skilled in the art and may therefore not necessarily be mentioned herein.

The classification decision for a given pixel as being either a background pixel or a non-background pixel depends on the classification algorithm used during the determination of the number of non-background pixels. Exemplary algorithms utilize a threshold criterion which relates to attributes such as (single-channel or combined) intensity, brightness, or signal strength encoded by each pixel.

The present invention in some embodiments recognizes that background areas of an image often do not significantly contribute to processing workload, and therefore, the number of non-background pixels is considered as a robust and significant quantity which can be regarded as approximately proportional to the workload. This may be especially relevant to medical image pre-processing algorithms such as stain normalization algorithms, which are regularly executed on medical images which typically depict a sample in front of a practically uniform background.

Embodiments of the present invention may provide the advantage of balancing the workload between the computing nodes assigned for performing the processing of the digital image. Thus, the total workload (the total time taken) for processing the image may be minimized. This may yield a more efficient use of the available computing resources. Embodiments may be unbiased with respect to the image content and therefore be universally applicable.

According to embodiments, the digital image has a primary resolution, the method further comprising receiving a copy of the digital image, the copy having a secondary resolution lower than the primary resolution, the number of non-background pixels being determined, for each of the image segments, in the copy segment corresponding to the image segment.

Applying the determined segmentation to the second copy means that, if the segmentation of the first copy is referred to as a first segmentation, the segmentation of the second copy is a second segmentation which comprises the first segmentation linearly scaled from the first resolution to the second resolution. Thus, the two segmentations establish a unique (bijective) mapping between the first and second image segments. Inferring the number of non-background pixels from a corresponding number determined at a lower resolution may reduce the computational overhead caused by the workload balancing itself. If, for instance, the secondary resolution differs from the primary resolution by a factor of four (each dimension of the copy being scaled down from the digital image by a factor of two), the number of non-background pixels comprised by a given copy segment is only about one fourth of the number of non-background pixels comprised by the corresponding image segment. This may reduce the requirement for computing resources for balancing the workload.

According to embodiments, the determination of the segmentation comprises determining a copy segmentation of the copy into two or more copy segments; and performing the determination of the segmentation by scaling the copy segmentation from the secondary resolution to the primary resolution. This may increase the efficiency of usage of computing resources for determining the segmentation, especially if image information of the digital image is taken into account during the segmentation.

According to embodiments, the digital image and the copy are embedded parts of a single data file. This may further reduce the overhead/computational effort/utilization of computing resources because the digital image does not have to be scaled down during the balancing.

According to embodiments, the receipt of the copy comprises calculating the copy from the digital image. This may allow a user to choose a suitable scaling algorithm for a particular processing task. Furthermore, this may allow to scale the image to a custom resolution which may be not included in the data file or stream from which the digital image was received.

According to embodiments, the primary resolution is at least four times the secondary resolution. This may ensure that the relative saving of computing resources is significant.

According to embodiments, the method further comprises generating a segment list, each of the image segments being represented by an entry of the segment list, the entries being sorted by the number of non-background pixels of the represented image segment, the balancing of the workload being performed according to a workload-balancing assignment scheme applied to the sorted segment list.

This may provide an especially simple means for balancing the workload, where no actual analysis of the image content is performed, but a list representing the segments is sorted, so that the utilization of computing resources for balancing the workload may be further reduced.

According to embodiments, the workload-balancing assignment scheme comprises one of the following: a round-robin assignment; a round-robin assignment with reversal; and a pairwise assignment of a leading entry of the sorted segment list with a trailing entry of the sorted segment list.

Round-robin and pairwise assignment schemes use an approach of ordering the entries of the segment list by counting them through instead of calculating an exact sorted position for each entry. The usage of counting schemes may require no further calculations on the image data, thus a further reduction of computing resources may be achieved for the balancing of the workload.

According to embodiments, the balancing of the workload is performed by minimizing a total processing cost metric.

This may provide a more precise means for balancing the workload. Quantitatively, this may further reduce the dispersion of the workload to be processed by different computing nodes. A feasible total cost metric may relate to the total processing time (i.e. the time from a first computing node starting to process a first segment until a last computing node finishes processing a last segment), but also include many other measures such as network delay times, available computing performance characteristics of a given node (e.g. its available memory capacity), etc.

According to embodiments, the total processing cost metric comprises a measure of dispersion of a segment sum over the assigned computing nodes, the segment sum of a given one of the assigned computing nodes comprising the sum, over the image segments assigned to the given computing node, of the number of non-background pixels comprised by the respective image segment.

The segment sum aggregates the total number of all non-background pixels of all segments assigned to a given computing node. Various measures or functions may serve for characterizing the dispersion, e.g. the difference between a smallest and a largest segment sum, a standard deviation over all segment sums, or the sum of squared deviations from a mean over all segment sums. Minimization of the dispersion may be achieved using one of various known approaches, e.g. using a least-squares algorithm. The minimization of dispersion of the segment sum may balance the workload more equally between the assigned computing nodes.

According to embodiments, the measure of dispersion is proportional to the difference between a highest value of the segment sum and a lowest value of the segment sum.

Calculating the difference between the highest and the lowest segment sum may simplify the calculation of a minimization criterion applied for performing the minimization of the segment sum dispersion, and therefore further reduce the utilization of computing resources for balancing the workload.

According to embodiments, the total processing cost metric is based on a first configuration information of the distributed computing environment, the first configuration information comprising one or more of the following: a number of the computing nodes being available for performing the processing, a number of available processor cores for each available processing node, a number of available processing threads for each available processor core, an available memory capacity for each available processing node, a bandwidth of a communication connection to each of the assigned computing nodes via the communications network, and a latency of a communication connection to each of the assigned computing nodes via the communications network. The term "processor cores" is to be understood in general terms, as the computing entity within a processing node may comprise of a number of CPUs, GPUs and/or FPGAs.

According to embodiments, the determination of the assignment is further based on a second configuration information of the distributed computing environment, the second configuration information comprising one or more of the following: a number of the computing nodes being available for performing the processing, a number of available processor cores for each available processing node, a number of available processing threads for each available processor core, an available memory capacity for each available processing node, a bandwidth of a communication connection to each of the assigned computing nodes via the communications network, and a latency of a communication connection to each of the assigned computing nodes via the communications network.

These embodiments may take into account (with or without calculating a cost metric) the actual amount of available computing resources which may vary from node to node. Nodes with a high capacity may thus receive a larger workload than nodes with more limited resources. This may further increase efficiency of computing resource utilization, and may provide a more accurate balancing which does not rely on assuming a nearly equal distribution of computing performance and resources and/or isotropy of the communications network. Taking into account node-specific network bandwidths and/or latencies may compensate the effect that different nodes may have different amounts of communications overhead, and thus a more homogeneous balancing may be achieved.

According to embodiments, the method further comprises determining a number of the computing nodes being available for performing the processing, the method further comprising selecting a processing mode, the processing mode comprising a combination of either a single-node mode or a multiple-node mode with either a single-batch mode or a multiple-batch mode, each of the processing modes having assigned a mode cost function, the mode cost function being descriptive of one of an expected latency associated with the processing of the image segments; an expected computing capacity for performing the processing; and a combination thereof, the assignment of each of the image segments to one of the computing nodes comprising, in the single-node mode, assigning all of the image segments to a same computing node, and in the multiple-node mode, assigning the image segments to two or more of the computing nodes, wherein for each of the assigned computing nodes, when causing the computing node to process the image segments assigned to the computing node, the single-batch mode comprises loading all of the image segments assigned to the computing node into a memory of the computing node simultaneously, and the multiple-batch mode comprises grouping the image segments assigned to the computing node into two or more non-empty batches to be processed by the computing node subsequently, the selection of the processing mode comprising:

if the number of available computing nodes is greater than one, calculating the mode cost function for each of the processing modes and selecting the processing mode having a minimum of the assigned mode cost functions;

else if a data size of each of the image segments assigned to the available computing node is less than or equal to an available memory capacity of the available computing node, selecting the processing mode comprising the combination of the single-node mode with the single-batch mode;

else, selecting the processing mode comprising the combination of the single-node mode with the multiple-batch mode.

This may ensure that limiting factors on the scale of the distributed computing environment are taken into account for minimizing the workload. For instance, a processing of all image segments by the same computing node may be feasible if the cost for distributing and returning batches of image segments via the communications network is high. Likewise, a grouping of the image segments assigned to a given computing node into two or more batches which are subsequently processed may be feasible if distributed single-batch processing would incur further cost because the cost for distributing and returning batches of image segments via the communications network is high. The usage of mode cost function may ensure that the decision for utilizing a particular processing mode is made on an objective basis.

Furthermore, the graded conditional approach to selecting a particular processing mode may render the actual calculation and comparison of the mode cost functions unnecessary in some cases, and therefore yield a more efficient use of computing resources for performing the selection of the processing mode. In particular, the graded conditional approach may allow for skipping the calculation of the mode cost function assigned to the combination of the single-node mode with the multiple-batch mode when calculating the mode cost function for each of the processing modes. this is because said combination may be only feasible if only one computing node is available, while the calculation of the functions according to the graded conditional scheme requires that two or more nodes are available. A more detailed explanation of advantages and delimitations of the several processing modes is given in the discussion of FIG. 4B further below.

The expected latency associated with the processing of the image segments may comprise any time interval or delay caused by the processing itself (i.e., the time taken by a respective computing node for the processing of the image segments) or any earlier or later actions in a deterministic chain of actions starting from the causing of the computing nodes to process the image segments and comprising the processing, which includes, without limitation, transporting and handling of the image segments (e.g. transmitting the segments via the communications network, loading and unloading a given batch of image segments to and, respectively, from a memory of a respective computing node, etc.). The expected computing capacity may comprise, for instance, a processor performance or a free memory space available from one or more of the computing nodes. A mode cost function relating to a combination of a latency and a computing capacity may be a weighted combination and should take into account that a larger latency or a smaller computing capacity result in a larger mode cost function.

According to embodiments, the mode cost function $F_1$ assigned to the combination of the single-node mode with the single-batch mode is $F_1=w_1*B$ if $B \leq M$ and $F_1=INF$ if $B>M$, the mode cost function $F_2$ assigned to the combination of the single-node mode with the multiple-batch mode being $F_2=w_1*B+w_2*B/M$, the mode cost function $F_3$ assigned to the combination of the multiple-node mode with the single-batch mode being $F_3=w_1*B/N+w_3*N$, the mode cost function $F_4$ assigned to the combination of the multiple-node mode with the multiple-batch mode being $F_4=w_1*B/N+w_2*B/M/N+w_3*N$, wherein B is a data size of the non-background pixels of the digital image, M is a total memory capacity of the available computing nodes, N is the number of available computing nodes, INF is a value representing positive infinity, and $w_1$, $w_2$ and $w_3$ are weight factors. However, as can be appreciated by those skilled in the art, the mode cost functions F1-F4 may not be limited to the particular definitions provided above, but other definitions capturing other or further attributes of the overall system may be included.

This may be an especially efficient choice for defining the mode cost functions because some or all of the variables B, M and N may be available in an up-to-date condition on a global level of the distributed computing environment. In this case, no further calculations or analysis steps may need to be performed for determining the values of the variables delivered by the environment. The weight factors $w_1$, $w_2$ and $w_3$ may be empirical values and/or determined by a test procedure and/or from the output of a training procedure of a machine learning model.

According to embodiments, the determination of the segmentation is based on a third configuration information of the distributed computing environment, the third configuration information comprising any of a number of the computing nodes being available for performing the processing and an available memory capacity of each available computing node.

Taking configuration information into account when determining the segmentation may yield an optimized number of image segments. In particular, a too low number of image segments may result in segments with large dimensions which occupy large amounts of memory capacity and may have to be split up into sub-segments to ensure that each image segment fits into the memory of the assigned computing node. For instance, a segmentation based on the number of available computing nodes may be performed such that each node is assigned an equal number image segments.

According to embodiments, the method further comprises, in case that the third configuration information comprises an available memory capacity of each available computing node, determining a minimum of the available memory capacity over the available computing nodes, the determination of the segmentation being performed such that a data size of each of the image segments is less than the minimum of the available memory capacity.

This may further increase the efficiency of usage of computing resources. If a segment does not fit into the available memory of a given node, it would have to be split up into sub-segments or redistributed to other computing nodes, which would create additional overhead and/or reduce the efficiency of the balancing.

Figure 1:
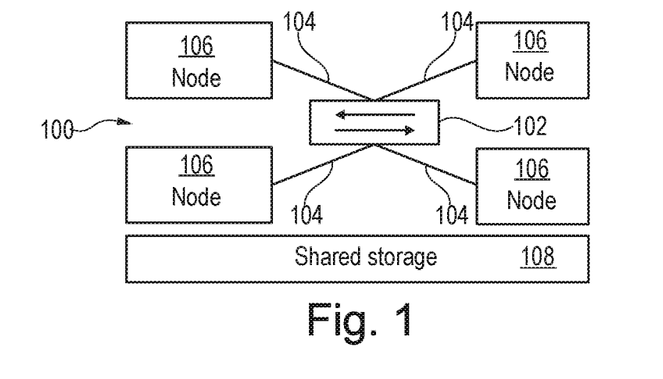
FIG. 1 depicts an exemplary distributed computing environment.
Figure 4A:
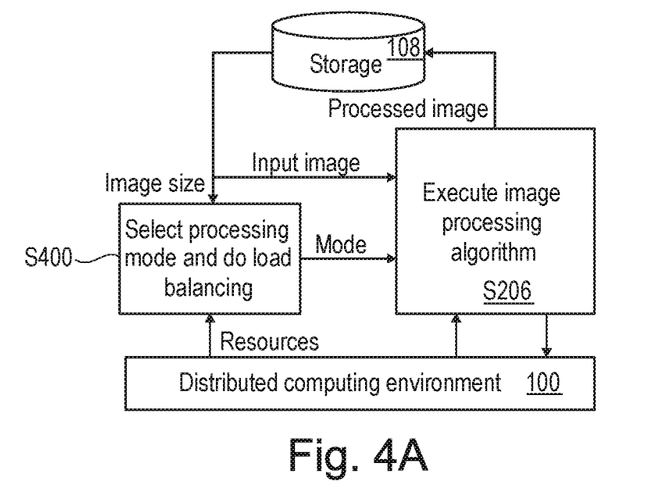
FIG. 4A depicts an exemplary hardware context of a workflow for balancing image processing workload with processing mode selection.

Now turning to the drawings, FIG. 1 depicts a schematic illustration of an exemplary distributed computing environment 100 suitable for performing the method for processing a digital image, in particular, medical images, known as whole-slide images, which are generated by a medical imaging scanner and stored in a multi-resolution or multi-magnification format. The computing environment 100 comprises computing nodes 106 which are communicatively coupled by communication connections 104 of a communications network. The network further comprises a central node 102 featuring network hub and/or load balancing functionality. The computing nodes 106 and/or the central node 102 are in communicative connection with a shared storage 108 which allows for providing unprocessed digital images to the computing nodes 106 and receiving processed digital images from the computing nodes 106 via the communications network. The central node 102 or one of the computing nodes 106 may likewise be configured as a control unit, i.e. for executing software program which causes the control unit to perform the method for processing a digital image. If the method is implemented by one of the computing nodes 106, the computing environment 100 may be set to a hierarchic configuration such as master/slave or client/server. An example for hardware utilization by the method is shown in FIG. 4A.

Figure 2A:
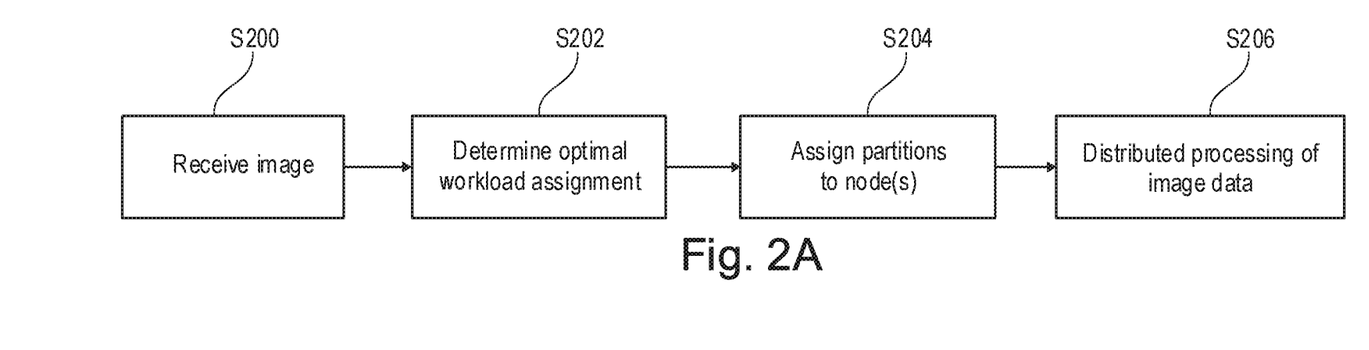
FIG. 2A depicts an overall distributed image processing workflow.

FIG. 2A depicts a flow diagram of an overall distributed image processing workflow within which balanced assignment of image segments can be implemented. In step S200, the control unit (i.e. the tangible or virtual machine performing the method) receives the digital image via a wired or wireless communication interface or a local port or connector of the control unit, e.g. as a data stream from a computing node or as a file retrieved from a repository or read from a storage device. The workflow continues with determining S202 an optimal assignment of the processing workload to one or more computing nodes. Step S202 comprises partitioning, or segmenting, the image into two or more image segments, and assigning these segments to one or more computing nodes, such that the time taken by the assigned computing nodes can be expected to be equal, i.e. the variation in total processing time is small (preferably, 1% or less) compared to the total processing time for each assigned computing node. Eventually, the control unit assigns S204 the image partitions or segments to one or more computing nodes of the distributed computing infrastructure and causes S206 the assigned computing nodes to perform the processing of the respectively assigned image segments. Step S206 may comprise generating a batch data structure for each assigned computing node, the batch comprising some or all of the image segments assigned to the given computing node, and transmitting each batch to the respective computing node via a communication connection established via the communications network.

Figure 2B:
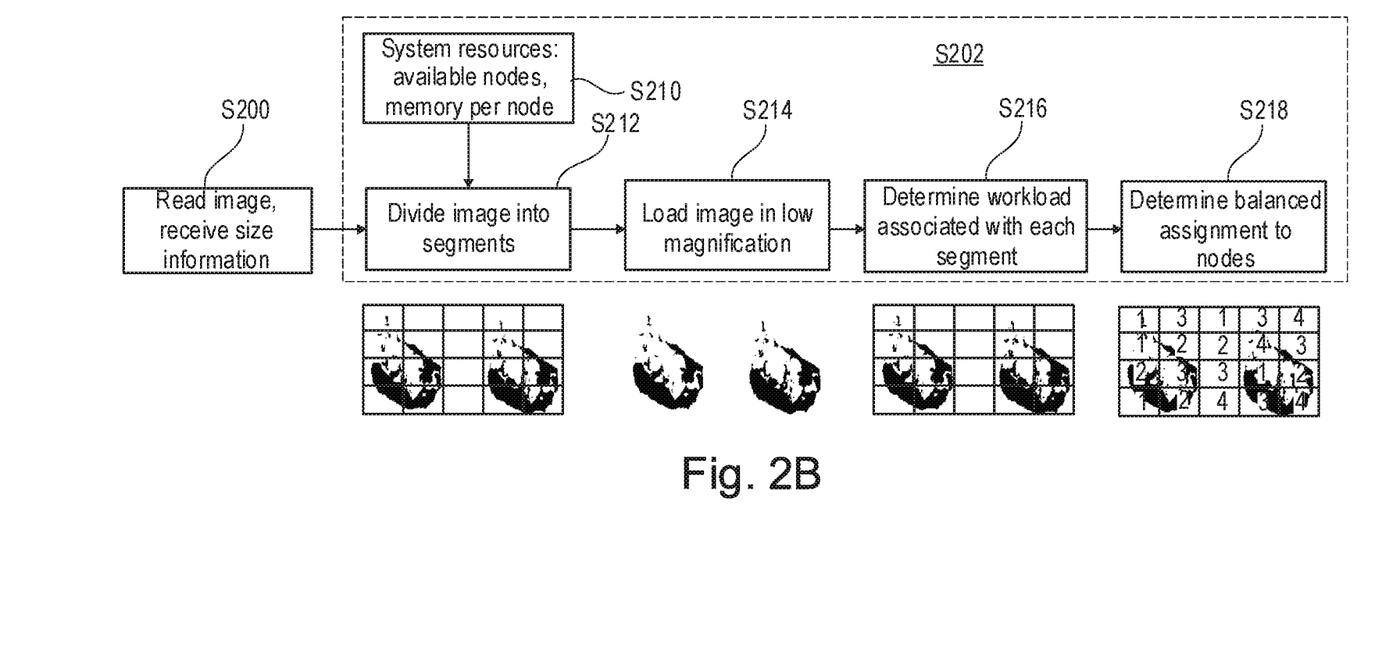
FIG. 2B depicts a workflow for balancing image processing workload.

FIG. 2B depicts a flow diagram representing a workflow for balancing the workload for the processing of the digital image. This balancing workflow may be embedded as step S202 into the overall workflow shown in FIG. 2A (indicated as a dashed box in FIG. 2B), where step S200 described above precedes the balancing workflow S202 and step S204 follows the balancing workflow S202. The balancing workflow S202 comprises steps S210 to S218. In step S210, the control unit receives configuration information describing computing resources of the distributed computing environment. Such configuration information may comprise, without limitation, a number of computing nodes which are available for processing segments of the digital image as well as further configuration information about these available nodes.

Without limitation, the configuration information may comprise a number of available processor cores for each available processing node, a number of available processing threads for each available processor core, an available memory capacity for each available processing node, a bandwidth of a communication connection to each of the assigned computing nodes via the communications network, and a latency of a communication connection to each of the assigned computing nodes via the communications network. That is, the term "configuration information" is to be understood in a broader sense so that it may also include current status information (such as a node-specific network latency and bandwidth relative to the control unit) about a temporary property or behavior of any element of the distributed computing environment.

Based on the configuration information and properties of the digital image (which may include metadata such as dimensions of the image, number and configuration of channels (e.g. color channels), number and type of embedded magnifications, etc.) the control unit determines S212 a segmentation of the digital image into two or more segments. An example of configuration-dependent segmentation comprises dimensioning the image segments in a standard size which fits the smallest available memory capacity. In another example, the segment sizes are determined individually such that each segment can be loaded into the memory of at least one available computing node. This approach may be iterative, i.e. comprising preliminary dimensioning of the segments, preliminary assignment of the preliminary segments, and reassigning and/or re-dimensioning any segments which exceed the available memory of their respective computing node according to the preliminary assignment.

The segmentation is followed by loading S214 a copy of the digital image at a low resolution. Such downscaled copy may be included in the data file or stream comprising the digital image at its full (largest) resolution. Alternatively or additionally, the copy may be calculated from the digital image by the control unit in order to obtain the copy at a desired resolution and/or using a custom scaling algorithm. The copy is scaled from the digital image at a constant and identical scale factor in both dimensions of the digital image.

In step S216 the control unit uses the low-resolution copy to estimate the number of non-background pixels included in each of the segments. This can be achieved by determining the number of non-background pixels in the copy and, if required, multiplying this number by the scale factor. It is presently assumed that the error of this estimation performed in the low resolution copy is small and that the estimation performed in the low resolutions is representative of the actual value in the primary resolution. At the same time, it can be appreciated that the computational cost for performing the estimation in the low resolution copy may be very low compared to the primary resolution. The number of non-background pixels of an image segment is considered as being approximately proportional to the workload required for processing the whole image segment. Therefore, the number of non-background pixels is used herein as a criterion for balancing the workload for processing the digital image in the distributed computing environment.

The number of non-background pixels may be determined using any known algorithm for this purpose, e.g. an algorithm which implements a threshold criterion e.g. in terms of intensity (e.g. signal strength, amplitude or brightness) of one or more channels of the image.

Preferably taking into account the configuration information received in step S210, the control unit then determines S218 a balanced assignment of the image segments to one or more of the available processing nodes according to one of the approaches described herein. In an example, it is assumed that each computing node provides an approximately equal computing performance; then, the workload can be expected to be balanced if the total number of non-background pixels of all image segments assigned to a given computing node is approximately equal for all assigned computing nodes. However, the control unit may perform the assignment with differences in the total number of non-background pixels per computing node in order to take into account differences in computing capacities or performance, or differences in latency time incurred from loading and unloading the image data into memory, transferring the data via communication connections of different bandwidths, etc. In this case, a computing node with smaller performance characteristics and/or computing capacities and/or greater latency times would be assigned a smaller (i.e., below average) total number of non-background pixels.

If a preliminary assignment was made in step S212, step S216 comprises a re-assignment of the image segments. If the workload balancing requires a re-assignment of a given image segment to a computing node with insufficient memory capacity for loading the image segment, the given segment may be split e.g. into two smaller segments which individually fit the available capacity of the assigned computing node. In any case, the workload-balancing assignment should have a higher priority than the preliminary assignment, and any sub-segments obtained by splitting the given image segment shall be assigned to the same computing node as required by the workload-balancing assignment for the non-split segment in order to maintain the total number of non-background pixels per computing node. Without limitation to the aforementioned case of re-assigning and splitting a given image segment, the present method does not require that the image segments are of equal size.

Figure 3A:
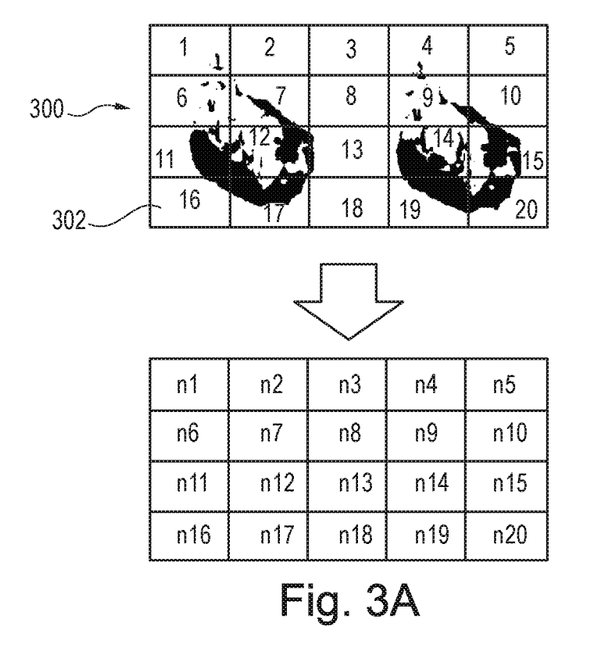
FIG. 3A depicts a process of determining the number of non-background pixels of a segmented digital image.

FIG. 3A depicts a process of determining the number of non-background pixels of a digital image 300 which was segmented into twenty image segments 302. The sample picture in the upper part of the drawing was first published during the Tumor Proliferation Assessment Challenge 2016 ("TUPAC16")—MICCAI Grand Challenge and is presently available online under http://tupac.tue-image.nl/node/3. A discriminator algorithm (represented by a downward arrow pointing from the upper to the lower part of the drawing) is applied to each of the image segments 302 and the resulting number of pixels classified as non-background pixels is counted. Alternatively, the number of background pixels is determined and counted and subtracted from the total number of pixels for each segment 302. The number of non-background pixels in a segment 302 having an index number k is represented by the symbol $n_k$ in the matrix in the lower part of the drawing.

Figure 3B:
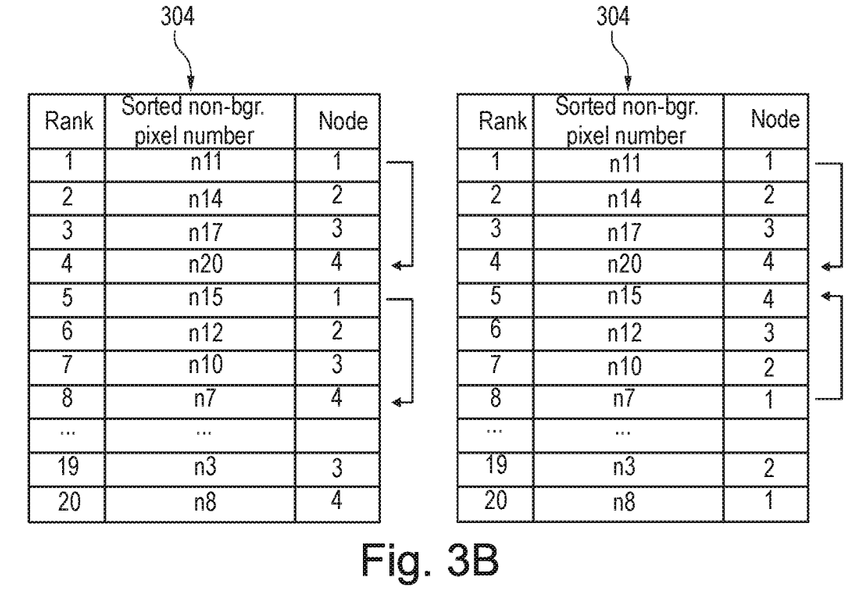
FIG. 3B depicts examples of a balanced assignment using a sorted segment list.

FIG. 3B depicts two examples of a balanced assignment using a sorted segment list 304. In each line, both lists show in the left column the rank of each segment in descending order of $n_k$, in the central column the determined number $n_k$ of non-background pixels, and in the right column a number representing one out of four nodes which has been assigned for processing the respective image segment represented by this line.

In the left part of the drawing, the nodes were assigned according to a round-robin scheme, i.e. segment 11 having rank 1 (having the largest number of non-background pixels) is assigned to node 1, segment 14 having rank 2 is assigned to node 2, segment 17 having rank 3 is assigned to node 3, segment 20 having rank 4 is assigned to node 4, segment 15 having rank 5 is assigned to node 1, and continuing the assignment of the image segments in descending rank order (rank 1 being regarded as ranking highest, i.e. an ascending rank number corresponding to a descending number of non-background pixels) to the four computing nodes in cyclic order of the node index.

In the right part of the drawing, the sorted segments (identical order as in the left part) are assigned to the nodes according to a round-robin scheme with reversal. In this case, the assignment of ranks 1 to 4 to nodes 1 to 4 is identical; however, ranks 5 to 8 are assigned in anti-cyclic order (rank 5 to node 4, rank 6 to node 3, rank 7 to node 2, and rank 8 to node 1). This 8-cyclic pattern is repeated for the remaining ranks 9 (assigned to node 1) to 20 (assigned to node 1).

In an alternative example, the assignment is made according to a pairwise scheme where the first and the last non-assigned rank in the list are assigned to the same computing node. In the rank order of the two lists shown in FIG. 3B, this would mean to assign ranks 1 and 20 to node 1, ranks 2 and 19 to node 2, ranks 3 and 18 to node 3, ranks 4 and 17 to node 4, ranks 5 and 16 to node 1, and continued in cyclic order of the nodes.

Figure 4B:
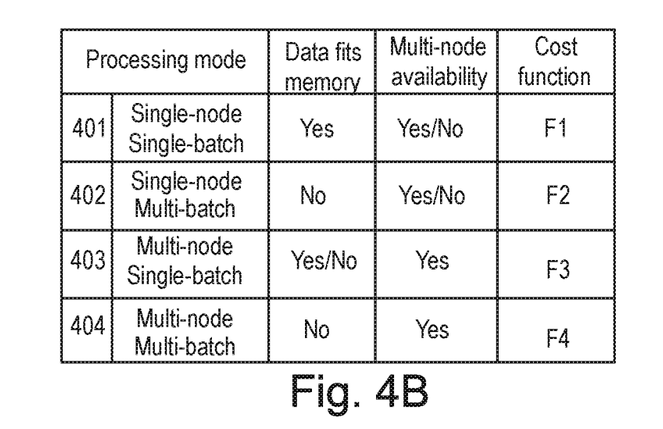
FIG. 4B depicts a table of processing modes.

FIG. 4A depicts an exemplary hardware context of a workflow for balancing the workload for processing the digital image, wherein the workflow additionally implements a processing mode selection, e.g. according to the system modes shown in FIG. 4B. As described above referring to FIG. 1, the distributed computing environment 100 provides a hardware-based and/or virtualized infrastructure which comprises one node or element configured to act as a control unit implementing the method for processing a digital image, and one or more nodes for performing the processing of the digital image. Although shown detached from the computing environment 100, the storage unit 108 forms part of the distributed computing environment 100.

The control unit receives a digital image from the storage unit 108 and determines and/or receives together with the image metadata of the digital image, comprising e.g. its dimensions (its resolution) and a characterization of channels encoding the picture information of the digital image. The control unit then performs the method for processing a digital image, comprising, in the scope of the example shown in FIG. 4A, segmenting the image; determining the number of non-background pixels for each segment; selecting a processing mode of the distributed computing environment 100; assigning the segments to one or more computing nodes of the environment 100 according to the selected processing mode and such that the workload is balanced; and causing S206 the assigned computing nodes to perform the processing of the digital image by implementing a corresponding image processing algorithm.

FIG. 4B depicts a table of processing modes which may be used for selecting a processing mode for the distributed computing environment 100 as described before. The table comprises four modes 401 to 404, each of which comprising a combination of either a single-node mode or a multiple-node mode with either a single-batch mode or a multiple-batch mode. In the single-node mode, the assignment of each of the image segments to one of the computing nodes comprises assigning all of the image segments to the same computing node. In the multiple-node mode, the assignment of each of the image segments to one of the computing nodes comprises assigning the image segments to two or more of the computing nodes. The single-batch mode comprises, for each of the assigned computing nodes, loading all of the image segments assigned to the computing node into a memory of the computing node simultaneously when causing the computing node to process the image segments assigned to the computing node. The multiple-batch mode comprises, for each of the assigned computing nodes, when causing the computing node to process the image segments assigned to the computing node, grouping the image segments assigned to the computing node into two or more non-empty batches to be processed by the computing node subsequently. Each of the processing modes 401 to 404 has assigned a respective cost function $F_1$ to $F_4$ which are descriptive of an expected latency associated with the processing of the image segments according to the requirements of the respective processing mode 401 to 404.

The table shown in FIG. 4B defines processing mode 401 as comprising the combination of the single-node mode with the single-batch mode and having assigned cost function $F_1$; processing mode 402 as comprising the combination of the single-node mode with the multiple-batch mode and having assigned cost function $F_2$; processing mode 403 as comprising the combination of the multiple-node mode with the single-batch mode and having assigned cost function $F_3$; and processing mode 404 as comprising the combination of the multiple-node mode with the multiple-batch mode and having assigned cost function $F_4$.

The selection of processing mode 401 may be feasible if the data amount B (also referred to as data size or data volume) which is occupied by a fully uncompressed representation of all segments of the digital image when loaded into a memory ("the memory footprint") can be loaded into the total available memory M of a single processing node as a single batch, i.e. without generating additional overhead to the processing due to a subsequent loading and unloading of multiple batches ("the overhead"). This may be the case if only a single computing node is available for performing the processing, but also if multiple computing nodes are available in case that network cost (bandwidth limitations, network latency) is high.

The selection of processing mode 402 may be feasible if the memory footprint of the digital image cannot be loaded into the total available memory M of a single processing node as a single batch, but no further computing nodes are available for sharing workload with the available computing node. The single available node is then operated with overhead cost for loading and unloading multiple batches to and from its available memory. Similar to the single-batch single-node mode, processing multiple batches by a single computing node may still be feasible if multiple computing nodes are available but the network cost (bandwidth limitations, network latency) is high.

The selection of processing mode 403 may be feasible if multiple computing nodes are available. This may be the case if the memory footprint of the digital image cannot be loaded into the total available memory M of a single processing node as a single batch, but as multiple batches which are distributed through the network (thereby incurring network cost) and processed by each node as a single batch without overhead. In addition, processing mode 403 may be feasible if the cost benefit of parallel processing outweighs the network cost.

The selection of processing mode 404 may also be feasible if multiple computing nodes are available, but at least one node is unable to load a single batch into its memory at a time. In this case, at least the batch of image segments assigned to said node is split into two or more batches, each having a memory footprint matching the available memory of said computing node.

Mode cost functions $F_1$ through $F_4$ should be defined so as to quantify these considerations in terms of B, M and the number N of available computing nodes. According to an exemplary definition, $F_1=w_1*B$ if $B \leq M$ and $F_1=INF$ if $B>M$ (INF being a value representing positive infinity); $F_2=w_1*B+w_2*B/M$; $F_3=w_1*B/N+w_3*N$; and $F_4=w_1*B/N w_2*B/M/N+w_3*N$. The weight factors $w_1$, $w_2$ and $w_3$ may be empirical values and/or determined by a test procedure and/or from the output of a training procedure of a machine learning model. The conditional term $F_1=INF$ may ensure that $F_1$ is not the smallest function (and thus, processing mode 401 is not selected) if the memory footprint of the digital image is too large for the available memory capacity of a considered single computing node. The term $w_1*B$ can be understood as representing a cost incurred by the processing itself (e.g. representing the processing time or the processing power or a linear combination thereof); $w_2*B/M$ as representing a cost incurred by loading and unloading multiple batches to and from the available memory; and $w_3*N$ as representing a network cost (e.g. representing the time taken for transferring the image data to the distributed computing nodes).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. Computer-implemented method for processing a digital image in a distributed computing environment, the distributed computing environment comprising a communications network interconnecting two or more computing nodes, the method comprising:
   receiving the digital image;
   determining a segmentation of the digital image into two or more image segments;
   for each of the image segments, determining a number of non-background pixels comprised by the image segment;
   determining an assignment of each of the image segments to one of the computing nodes, the determination of the assignment comprising balancing, based on the number of non-background pixels determined for each of the image segments, the workload of the assigned computing nodes responsive to processing the image segments, wherein a variation in total processing time is expected to be smaller than a threshold compared to a total processing time for each assigned computing node; and
   causing each of the assigned computing nodes to process the image segments assigned to the computing node.

2. The method of claim 1, the digital image having a primary resolution, the method further comprising receiving a copy of the digital image, the copy having a secondary resolution lower than the primary resolution, the number of non-background pixels being determined, for each of the image segments, in the copy segment corresponding to the image segment.

3. The method of claim 2, the determination of the segmentation comprising determining a copy segmentation of the copy into two or more copy segments; and performing the determination of the segmentation by scaling the copy segmentation from the secondary resolution to the primary resolution.

4. The method of claim 2, the digital image and the copy being embedded parts of a single data file.

5. The method of claim 2, the receipt of the copy comprising calculating the copy from the digital image.

6. The method of claim 2, the primary resolution being at least four times the secondary resolution.

7. The method of claim 1, further comprising generating a segment list, each of the image segments being represented by an entry of the segment list, the entries being sorted by the number of non-background pixels of the represented image segment, the balancing of the workload being performed according to a workload-balancing assignment scheme applied to the sorted segment list.

8. The method of claim 7, the workload-balancing assignment scheme comprising one of the following: a round-robin assignment; a round-robin assignment with reversal; and a pairwise assignment of a leading entry of the sorted segment list with a trailing entry of the sorted segment list.

9. The method of claim 1, the balancing of the workload being performed by minimizing a total processing cost metric.

10. The method of claim 9, the total processing cost metric comprising a measure of dispersion of a segment sum over the assigned computing nodes, the segment sum of a given one of the assigned computing nodes comprising the sum, over the image segments assigned to the given computing node, of the number of non-background pixels comprised by the respective image segment.

11. The method of claim 10, the measure of dispersion being proportional to the difference between a highest value of the segment sum and a lowest value of the segment sum.

12. The method of claim 9, the total processing cost metric being based on a first configuration information of the distributed computing environment, the first configuration information comprising one or more of the following: a number of the computing nodes being available for performing the processing, a number of available processor cores for each available processing node, a number of available processing threads for each available processor core, an available memory capacity for each available processing node, a bandwidth of a communication connection to each of the assigned computing nodes via the communications network, and a latency of a communication connection to each of the assigned computing nodes via the communications network.

13. The method of claim 1, the determination of the assignment being further based on a second configuration information of the distributed computing environment, the second configuration information comprising one or more of the following: a number of the computing nodes being available for performing the processing, a number of available processor cores for each available processing node, a number of available processing threads for each available processor core, an available memory capacity for each available processing node, a bandwidth of a communication connection to each of the assigned computing nodes via the communications network, and a latency of a communication connection to each of the assigned computing nodes via the communications network.

14. The method of claim 1, further comprising determining a number of the computing nodes being available for performing the processing, the method further comprising selecting a processing mode, the processing mode comprising a combination of either a single-node mode or a multiple-node mode with either a single-batch mode or a multiple-batch mode, each of the processing modes having assigned a mode cost function, the mode cost function being descriptive of one of an expected latency associated with the processing of the image segments; an expected computing capacity for performing the processing; and a combination thereof, the assignment of each of the image segments to one of the computing nodes comprising, in the single-node mode, assigning all of the image segments to a same computing node, and in the multiple-node mode, assigning the image segments to two or more of the computing nodes, wherein for each of the assigned computing nodes, responsive to causing the computing node to process the image segments assigned to the computing node, the single-batch mode comprises loading all of the image segments assigned to the computing node into a memory of the computing node simultaneously, and the multiple-batch mode comprises grouping the image segments assigned to the computing node into two or more non-empty batches to be processed by the computing node subsequently, the selection of the processing mode comprising:

if the number of available computing nodes is greater than one, calculating the mode cost function for each of the processing modes and selecting the processing mode having a minimum of the assigned mode cost functions;

else if a data size of each of the image segments assigned to the available computing node is less than or equal to an available memory capacity of the available computing node, selecting the processing mode comprising the combination of the single-node mode with the single-batch mode;

else, selecting the processing mode comprising the combination of the single-node mode with the multiple-batch mode.

15. The method of claim 14, the mode cost function $F_1$ assigned to the combination of the single-node mode with the single-batch mode being $F_1=w_1*B$ if $B \leq M$ and $F_1=INF$ if $B>M$, the mode cost function $F_2$ assigned to the combination of the single-node mode with the multiple-batch mode being $F_2=w_1*B+w_2*B/M$, the mode cost function $F_3$ assigned to the combination of the multiple-node mode with the single-batch mode being $F_3=w_1*B/N+w_3*N$, the mode cost function $F_4$ assigned to the combination of the multiple-node mode with the multiple-batch mode being $F_4=w_1*B/N+w_2*B/M/N+w_3*N$, wherein B is a data size of the non-background pixels of the digital image, M is a total memory capacity of the available computing nodes, N is the number of available computing nodes, INF is a value representing positive infinity, and $w_1$, $w_2$ and $w_3$ are weight factors.

16. The method of claim 1, the determination of the segmentation being based on a third configuration information of the distributed computing environment, the third configuration information comprising any of a number of the computing nodes being available for performing the processing and an available memory capacity of each available computing node.

17. The method of claim 16, further comprising, in case that the third configuration information comprises an available memory capacity of each available computing node, determining a minimum of the available memory capacity over the available computing nodes, the determination of the segmentation being performed such that a data size of each of the image segments is less than the minimum of the available memory capacity.

18. A computer program product for processing a digital image in a distributed computing environment, the distributed computing environment comprising a communications network interconnecting two or more computing nodes, the computer program product comprising a non-transitory computer readable storage medium having program instructions embodied therewith, the program instructions executable by a processor to cause the processor to:

receive the digital image;

determine a segmentation of the digital image into two or more image segments;

for each of the image segments, determine a number of non-background pixels comprised by the image segment;

determine an assignment of each of the image segments to one of the computing nodes, the determination of the assignment comprising balancing, based on the number of non-background pixels determined for each of the image segments, the workload of the assigned computing nodes responsive to processing the image segments;

generate a segment list, each of the image segments being represented by an entry of the segment list, the entries being sorted by the number of non-background pixels of the represented image segment, the balancing of the workload being performed according to a workload-balancing assignment scheme applied to the sorted segment list, the workload-balancing assignment scheme comprising at least one of the following: a round-robin assignment; a round-robin assignment with reversal; and a pairwise assignment of a leading entry of the sorted segment list with a trailing entry of the sorted segment list; and cause each of the assigned computing nodes to process the image segments assigned to the computing node.

19. A computer system, comprising a processor, a memory and a communication interface to a distributed computing environment, the distributed computing environment comprising a communications network interconnecting the communication interface and two or more computing nodes, the memory carrying computer executable code for execution by the processor, wherein execution of the instructions causes the processor to perform a method for processing a digital image in the distributed computing environment, the method comprising:

receiving the digital image;

determining a segmentation of the digital image into two or more image segments;

for each of the image segments, determine a number of non-background pixels comprised by the image segment;

determining an assignment of each of the image segments to one of the computing nodes, the determination of the assignment comprising balancing, based on the number of non-background pixels determined for each of the image segments, the workload of the assigned computing nodes responsive to processing the image segments;

generating a segment list, each of the image segments being represented by an entry of the segment list, the entries being sorted by the number of non-background pixels of the represented image segment, the balancing of the workload being performed according to a workload-balancing assignment scheme applied to the sorted segment list, the workload-balancing assignment scheme comprising at least one of the following: a round-robin assignment; a round-robin assignment with reversal; and a pairwise assignment of a leading entry of the sorted segment list with a trailing entry of the sorted segment list; and causing each of the assigned computing nodes to process the image segments assigned to the computing node.

* * * * *